UNITED STATES PATENT OFFICE.

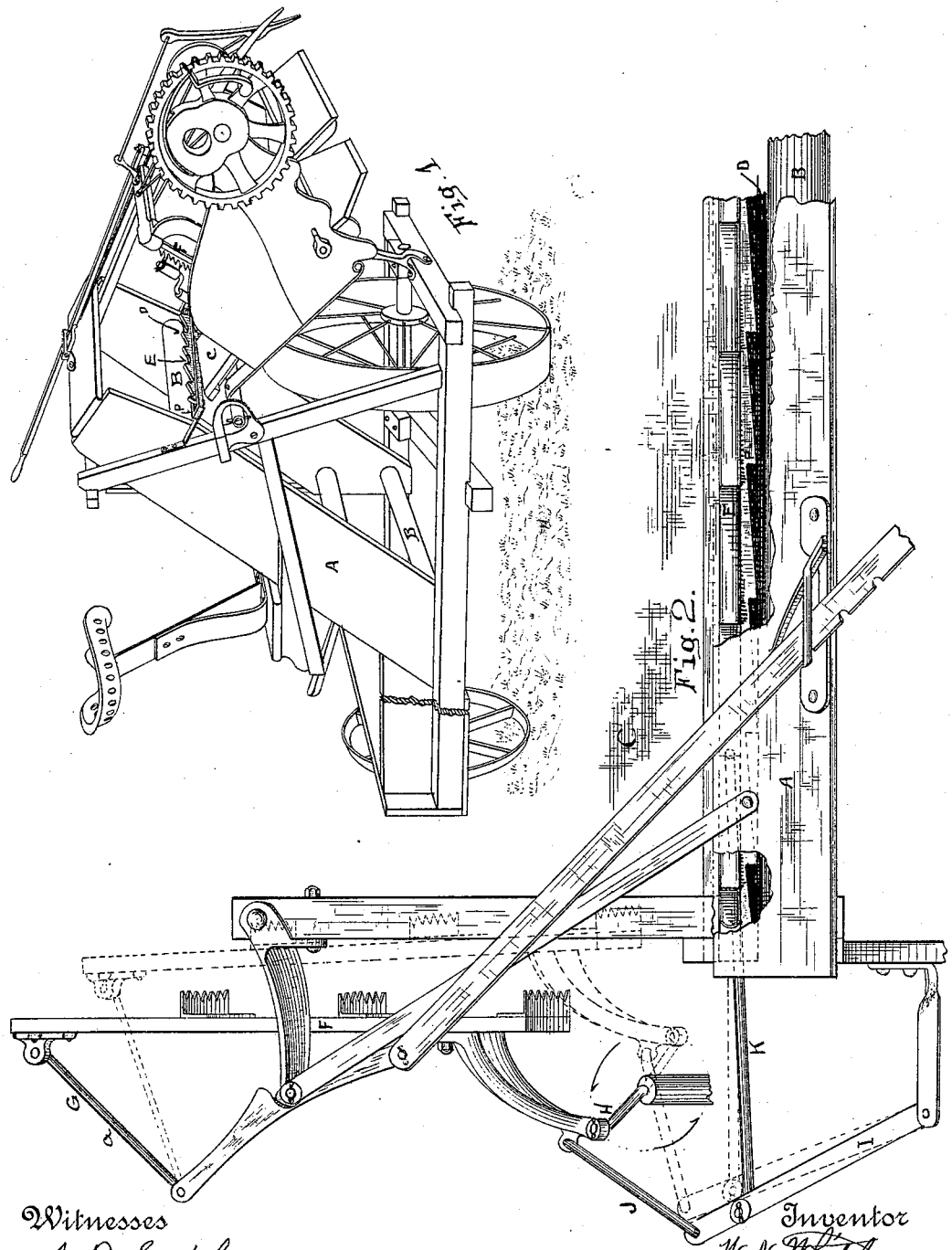

WILLIAM N. WHITELEY, OF SPRINGFIELD, OHIO.

GRAIN-BINDER.

SPECIFICATION forming part of Letters Patent No. 350,404, dated October 5, 1886.

Application filed September 25, 1885. Serial No. 178,175. (Model.)

*To all whom it may concern:*

Be it known that I, WILLIAM N. WHITELEY, of Springfield, in the county of Clark, in the State of Ohio, have invented new and useful Improvements in Automatic Binders; and I do declare that the following is a full and accurate description of the same, reference being had to the accompanying drawings, wherein—

Figure 1 is a perspective view of my machine, having my invention applied. Fig. 2 is a plan of my invention.

Between the upper roller of the elevator-belt and the deck or platform of the binder-receptacle there is necessarily a space, through which the carrier-belt descends after discharging the cut grain upon said deck. The straw which is carried up by the elevator always lies thereon more or less oblique to the line of motion, and some of it always tends to cling to the surface of the belt, and be thereby carried down between the upper elevator-roller and the edge of the deck, over which such straws are generally broken. In using these machines they clog principally by straw thus carried down and jammed. The straws so clogged cannot be removed except by pushing them endwise and bringing them in contact with something that can pull them off. I therefore place an agitator between the edge of the deck and the descending part of the belt to prevent the permanent lodgment of straw by crowding, as above mentioned. It is evident that a continually-traveling rake or a reciprocating rake may be employed, and that the effective or working surfaces may be in great variety. These will be apparent to any skilled person.

The form of the agitator which I have preferred and used may be described as follows: A is the elevator-frame, supported, as usual, upon the main frame of the harvester. B B' are the elevating-rollers, and C is the deck or platform of the binder-receptacle. These parts are all as usual, and do not require further description. D is the space necessarily left for the belt B' to descend through after having discharged the cut grain upon the platform C. E is a reciprocating rake placed in said space between the belt B' and the platform C, and arranged to be reciprocated therein, so that the straw which clings to the descending belt and tends to be drawn into the space D and jammed fast there is at the same time subjected to a lateral pull from the rake, and the straw is thereby prevented from descending into said space and jamming there, but is moved within reach of another rake, whereby it is forcibly moved downward over the deck C toward the binding apparatus, for which said deck forms a receptacle.

In the machine which I have constructed the rake E consists of a board placed edgewise in suitable guides and having its upper edge serrated or saw-toothed, so that as it moves in one direction it will slide under the grain, and when it moves in the reverse direction it will engage and pull the grain toward the side of the machine and within the influence of a packer or other impelling device, which moves the grain downward and inward in the binder-receptacle. The kind of a packer or receptacle rake employed is immaterial; but I prefer a butt-rake, F, having a circulatory reciprocation, being carried at its lower or free end by a vibrating arm or rod, and at its other by a crank of less radius than the length of said vibrating rod. By this butter the grain is forcibly moved from the belt and carried inward and downward over the deck C. The butter F is jointed at one end to a vibrating rod, G, the other end of the same being jointed to some stationary part. The other end of the butter is jointed to and carried by the crank H, which is driven by suitable gearing with the motive parts of the machine. The crank H, having a radius shorter than the length of the rod G, causes the cranked end of F to move in a circle, while the other end reciprocates on a curved line. A supplemental lever, I, is pivoted at one end of the frame of the machine, and at its other end connected with the crank H by a connecting-rod, J, so that as the crank H rotates the lever I is caused to vibrate. The rake E is connected with the lever I by means of a rod, K, and is thereby caused to reciprocate coincidently with the movements of the butter F. The rake E, as it reciprocates, alternately slides under and draws the grain forward with it, and to prevent any tendency of the straw to cling to said rake E and move back and forth with it a supplemental saw-toothed part, P, fixed to the frame by the side of said rake, and it may be constituting one of the guides for the same in its reciprocations, is employed, the saw-teeth in said part P being inclined in the same direction as the teeth of the rake E, so that grain which tends to cling to the reciprocating rake E will be caught and held by the stationary part P.

The butt-rake herein shown is not a part of this invention, but is described and claimed in my other application, the serial number whereof is 177,532.

Having described my invention, I claim as new—

1. A deck-cleaner arranged at the upper edge of the binder-receptacle and between the receptacle-deck and the elevating-belts, and having a transverse reciprocation thereto for the purpose of agitating the grain and moving the clogging straws crosswise and freeing them from the belt, as set forth.

2. A deck-cleaner provided with a serrated surface, or with an equivalent thereof, arranged between the elevating-belts and the binder-receptacle, and having a movement transverse to that of the elevating-belts, in combination with a fixed holding-surface lying across the line of movement of the belts for the purpose of holding the straws lying lengthwise, that the deck-cleaner may move in one direction without carrying the cross straws with it, substantially as shown and described, and for the purpose specified.

3. A deck-cleaner between the elevating-belts and deck of the binder-receptacle, constructed with teeth or other equivalent devices, and having a reciprocating movement imparted to it for the purpose of moving forward the straw that is drawn down between elevating-belts and upper edge of the binder-receptacle, in combination with a rake or other suitable mechanism at the forward end of the receptacle that will draw down or clear away the straw that is moved forward by the deck-cleaner, substantially as shown and described, and for the purpose specified.

WILLIAM N. WHITELEY.

Witnesses:
W. F. BEVITT,
L. PHILLIPS.